Aug. 18, 1931.  W. H. RADFORD  1,819,385
CLUTCH BRAKE
Filed May 20, 1929
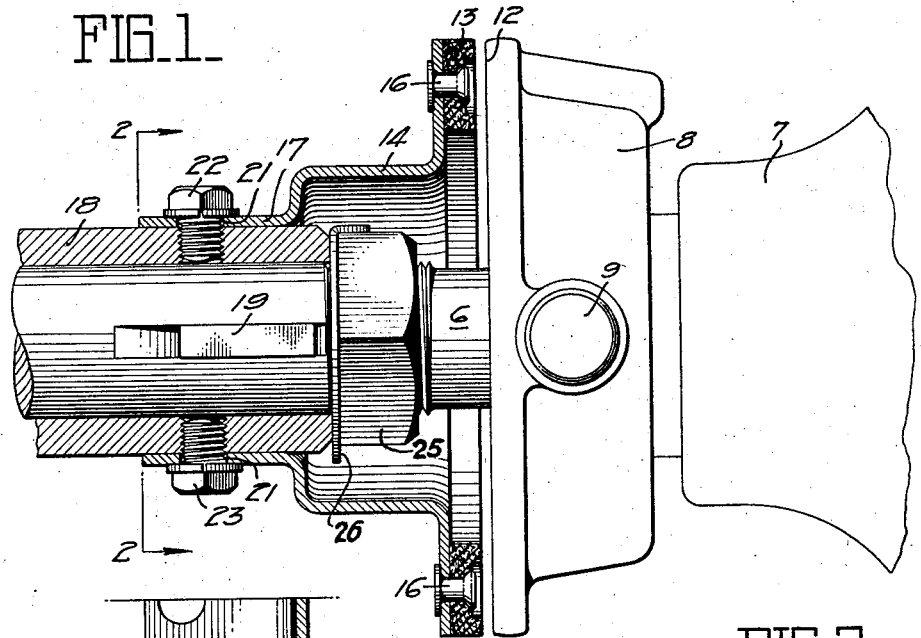
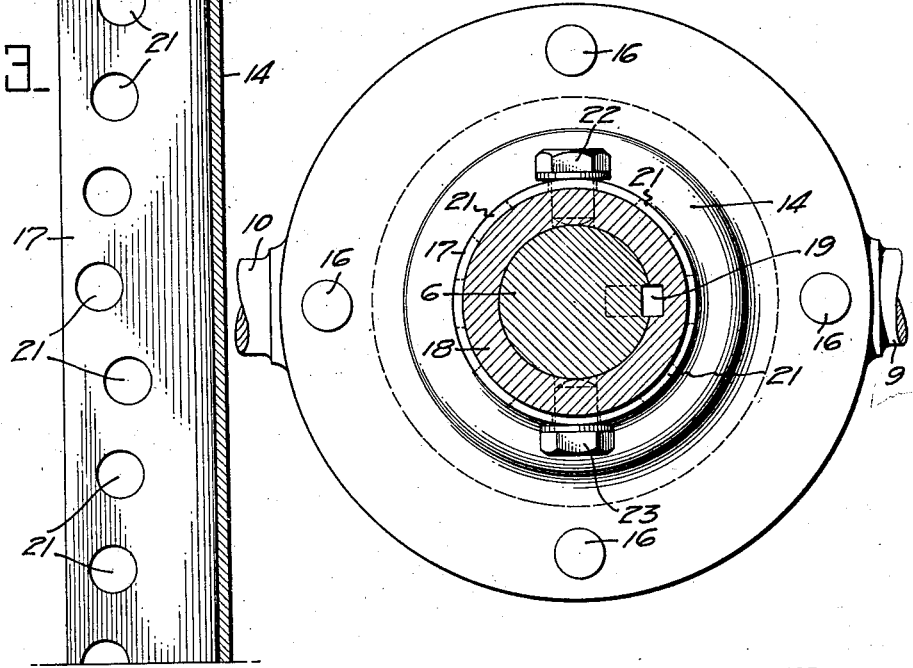
INVENTOR
William H. Radford
BY
White, Prost & Fryer
ATTORNEYS Patented Aug. 18, 1931

1,819,385

UNITED STATES PATENT OFFICE

WILLIAM H. RADFORD, OF SAN LEANDRO, CALIFORNIA, ASSIGNOR TO CATERPILLAR TRACTOR CO., OF SAN LEANDRO, CALIFORNIA, A CORPORATION OF CALIFORNIA

CLUTCH BRAKE

Application filed May 20, 1929. Serial No. 364,655.

My invention relates to devices for arresting relative motion between two rotatable elements and is particularly useful in arresting the driven member of a clutch when the clutch is disengaged. This is particularly important in automotive practice in which a friction clutch is disengaged during the changing of the gears.

An object of my invention is to provide a clutch brake which may be positively retained in any one of several adjusted positions.

Another object of my invention is to provide a simple means for compensating for wear of the clutch brake.

A further object of my invention is to provide an extremely simple and economical clutch brake.

The foregoing and other objects are attained in the embodiment of the invention shown in the drawings, in which Figure 1 is a side elevation of the clutch brake of my invention, the cup being shown in section on a vertical longitudinal plane.

Fig. 2 is a cross-section on the line 2—2 of Fig. 1.

Fig. 3 is a development of the hub of the cup, showing the several apertures therein.

In its preferred form, the clutch brake of my invention comprises a pair of relatively rotatable elements one of which is preferably affixed to a simultaneously rotatable shaft by means of a stud having a fixed location on the shaft and engageable with any one of several helicoidally spaced apertures in the element.

As shown in the drawings, the clutch brake of my invention is preferably incorporated with a shaft 6 which is a driven shaft extending from a clutch housing 7 and which is rotatably supported therein. The shaft 6 is surrounded with a ring 8 enclosing a clutch throw-out bearing. The ring 8 is non-rotatable with respect to shaft 6 and is capable of axial translation only. At opposite sides the ring carries trunnions 9 and 10 for connection to the clutch disengaging mechanism, not shown. When the trunnions 9 and 10 are moved to the left in Fig. 1, thereby translating the ring 8 to the left, the clutch is disengaged and the shaft 6 is disconnected from the driving member of the clutch.

In accordance with my invention I preferably provide ring 8 with a machined rear face 12 which is perpendicular to the axis of shaft 6 and which provides an extensive friction surface. To engage the friction surface 12 when the ring 8 is axially translated to disengage the clutch, I provide a cooperating friction surface 13 on a cup 14. The surface 13 is preferably comprised of a suitable friction material secured to the cup by rivets 16. The cup is conveniently fabricated of a sheet of pressed or stamped metal having a hub 17 in telescopic engagement with a sleeve 18 surrounding shaft 6 and secured thereto by a key 19 and retained thereon by nut 25 and washer 26. Although the sleeve 18 and shaft 6 are separate parts they function unitarily and in the claims I employ the term "shaft" to designate the combined structure. The friction material 13 on cup 14 is abutted by the ring 8 upon disengagement of the clutch and since the cup spins with shaft 6 the relative rotation of the ring and shaft is quickly braked.

To compensate for wear in the friction material 13 and also to secure any desired degree of braking effort I preferably provide an adjustable connection between the cup 14 and the shaft 6. This is effected in accordance with my invention by providing a plurality of apertures 21 in the hub 17 of the cup 14. The centers of these apertures are spaced helically around the hub and provide not only an axial displacement but also a circumferential displacement of the hub 17 with respect to the shaft 6. A stud 22 engages the shaft 6 thru a threaded aperture in the sleeve 18. The stud passes thru any selected one of the spaced apertures 21 and is balanced by a correspondingly mounted stud 23 diametrally opposed on the opposite side of shaft 6. By suitably selecting corresponding apertures 21 the cup 14 may be axially and circumferentially disposed on the shaft 6 to afford the desired braking action.

The operation of the device is as follows:
When the clutch 7 is to be disengaged, the ring 8 is moved to the left as shown in Fig. 1, bringing the face 12 in contact with the face 13 of rotating member 14 attached to driven shaft 6, thereby exerting a braking action upon the driven shaft 6 when it is released from the drive.

It is to be understood that I do not limit myself to the form of clutch brake shown and described herein, as the invention, as set forth in the following claims may be embodied in a plurality of forms.

I claim:

1. A clutch brake comprising a rotatable shaft, a non-rotatable ring surrounding said shaft, a cup encompassing said shaft and adapted to abut said ring, and means for fastening said cup to said shaft in any one of several axially and circumferentially spaced positions.

2. A clutch brake comprising a brake member, a shaft, said member and said shaft being mounted for relative rotation, a second brake member, and means for fastening said second brake member to said shaft in any one of several axially and circumferentially spaced positions.

3. A clutch brake comprising a rotatable shaft, a non-rotatable ring surrounding said shaft, a cup encompassing said shaft for abutting said ring and having a plurality of helically spaced apertures therein, and a stud adapted to pass thru any one of said apertures and engage the shaft in a fixed location.

4. A clutch brake comprising a shaft, a stud engaging said shaft, and a brake member telescoping said shaft and having a plurality of helically spaced apertures therein, any one of said apertures being adapted to encompass said stud.

5. A clutch brake comprising a shaft, a pressed metal cup encompassing said shaft and having a plurality of helically spaced apertures therein, a stud adapted to pass thru any selected one of said apertures and engage the shaft in a fixed location, and a member adapted to engage frictionally with said cup.

6. The combination with a driven shaft and the release member of a clutch therefor of a brake member adjustably mounted on said shaft for cooperation with said release member.

In testimony whereof, I have hereunto set my hand.

WILLIAM H. RADFORD.